No. 618,171. Patented Jan. 24, 1899.
H. GIESSEL.
COMBINED FILTER AND REFRIGERATOR.
(Application filed Dec. 24, 1896.)

(No Model.)

Witnesses
J. B. Keir
F. B. Cook

Inventor
Henry Giessel,
By Chas. E. Bulkley. Atty

UNITED STATES PATENT OFFICE.

HENRY GIESSEL, OF CHICAGO, ILLINOIS.

COMBINED FILTER AND REFRIGERATOR.

SPECIFICATION forming part of Letters Patent No. 618,171, dated January 24, 1899.

Application filed December 24, 1896. Serial No. 616,956. (No model.)

*To all whom it may concern:*

Be it known that I, HENRY GIESSEL, a citizen of the United States, residing at Chicago, in the county of Cook and State of Illinois, have invented a certain new and useful Combined Filter and Refrigerator, of which the following is a specification.

My invention has for its object the provision of an improved combined filter and refrigerator; and it consists in an arrangement and disposition of parts whereby the filtered water or other liquid is conveyed from the filtering medium to the containing-reservoir without contamination by free exposure to the air or contact with any portion of the refrigerating-compartment.

Reference may now be had to the accompanying drawings, in which—

Figure 1:
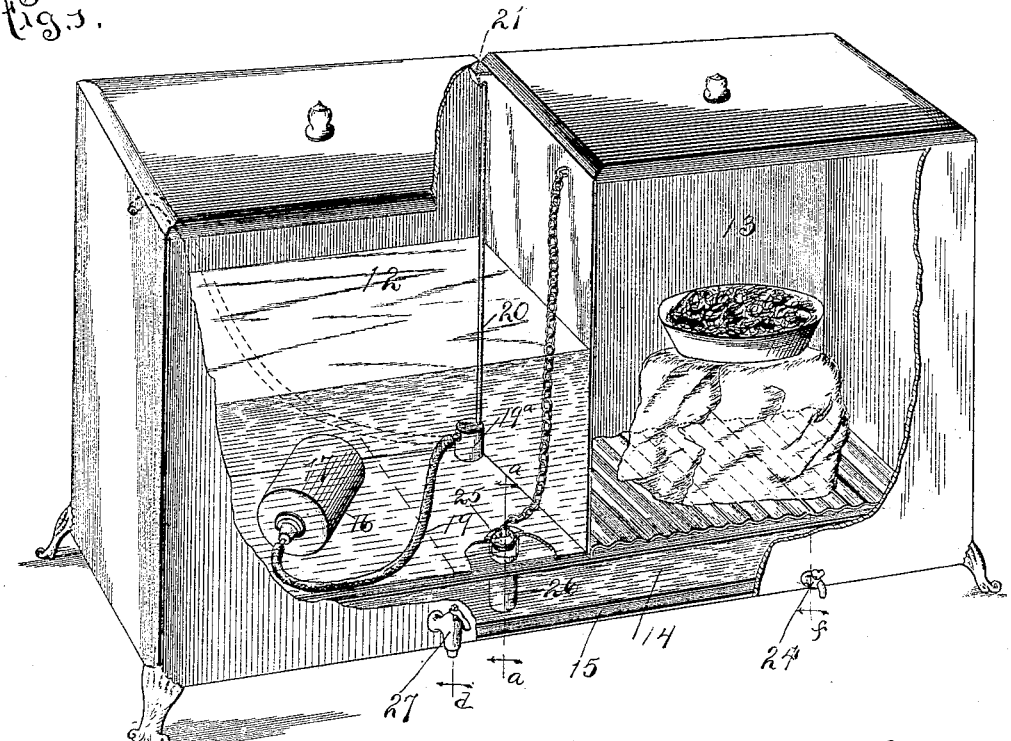
Figure 2:
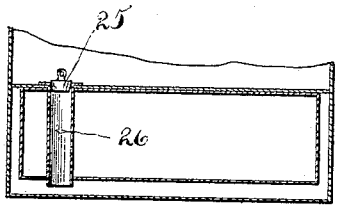
Figure 3:
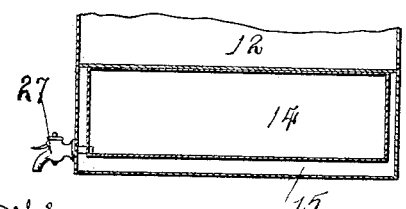
Figure 4:
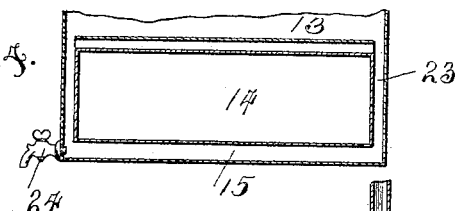
Figure 5:
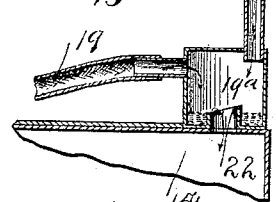
Figure 6:
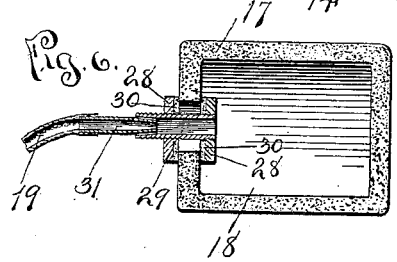

Figure 1 is a perspective view of a complete combined filter and refrigerator. Fig. 2 is a cross-section in the line $a\,a$ of Fig. 1. Fig. 3 is a like view on the line $d\,d$ of Fig. 1. Fig. 4 is a like view on the line $f\,f$ of Fig. 1. Fig. 5 is an enlarged detail sectional view of the intermediate receiving-chamber. Fig. 6 is a like view of the filtrating medium and manner of attaching the delivery-pipe thereto.

In carrying out my invention I provide two chambers 12 and 13, the former containing a body or unfiltered water and the latter serving as an ice-chamber and for the reception of articles to be preserved by the ice. Extended below the two chambers 12 and 13 is a chamber 14 for the reception of the filtered water, and below this chamber 14 is another like chamber 15, which receives the water from the melted ice within the chamber 13. In the chamber 12 is a filtrating medium 16, consisting of a suitable natural stone 17, which has a hollow interior 18, Fig. 6, this stone filtrate 17 being connected with a delivery-tube 19 of suitable flexibility.

In a combined filter and refrigerator it is eminently desirable that the filtered water should be completely isolated from the chamber or compartment within which the articles are placed for preservation and that the filtered water should be kept free from germ contamination by the necessarily foul air of such compartment.

In order to accomplish a complete isolation of the filtered water and yet permit its free passage into the filtered-water chamber 14, I provide the small intermediate chamber $19^a$, which is shown located in the water-chamber 12 at one of its corners. Having communication with the chamber $19^a$ is an air-riser 20, extended upwardly to transverse channel 21, communicating with the outer air. By this means the air is delivered to the interior of the chamber $19^a$, which latter is in all other respects isolated from communication with the compartments or chambers containing the water to be filtered or the articles to be preserved. It will also be observed that the delivery-tube 19 from the filtrating medium 16 has communication with the intermediate chamber $19^a$, and thus the body of water within the chamber 12 is filtered through the stone 17 and conducted from its hollow interior through the delivery-tube 19 to the intermediate chamber $19^a$. As the water is filtered slowly through the stone it passes through the delivery-tube and is fed drop by drop into the intermediate chamber. In order that the water may be discharged from the intermediate chamber into the filtered-water chamber 14, I provide a discharge-nozzle 22, which is of particular construction, Fig. 5, the one side of which is higher than the other in order that bubbles may not form over the opening to prevent the egress of the water.

By reference to Fig. 4 it will be observed that the water from the melted ice within the chamber 13 is adapted to pass down through the side channel 23 from the compartment 13 into the chamber 15, which water may be drawn off by the faucet 24. In order to discharge the chamber 12 to clean the same, the stop 25 may be withdrawn, which permits the water to pass directly through the tube 26 into the chamber 15, the filtrating medium 16 being suspended, as shown by the dotted lines in Fig. 1.

The filtered water may be withdrawn from the chamber 14 by the faucet 27, Fig. 3.

Referring to Fig. 6, the manner of attaching the delivery-tube 19 to the hollow stone 17 is shown consisting of disks 28, screw-threaded on the thimble 29 with the interposed washers 30, the nozzle 31 of the delivery-tube being wedged into the thimble 29, so as to be detachable therefrom.

From the foregoing description it is apparent that the water is first filtered through the natural-stone-filtering medium and thence delivered to a chamber which is small in size and completely isolated from the other chambers of the apparatus, a minute supply of air being fed to the said chamber from the exterior and of a quantity just sufficient to permit the flow of the water into the filtered-water chamber. By this means the filtered water is preserved from the free attacks of the air and is particularly preserved from contact with the chamber containing the articles to be preserved and also from exposure to the air therein. It will further be observed that the flexible delivery pipe or tube 19 is detachably secured to the filtrating medium 16 and that the said medium may be removed from the delivery-pipe, which is then suspended over the side of the chamber 12, as shown by the dotted lines.

Having thus described my invention, what I claim as new therein, and desire to secure by Letters Patent, is—

1. A combined filter and refrigerator consisting of a chamber for the water to be filtered, an ice-containing chamber and a chamber for the filtered water together with a filtrating medium within the chamber for the water to be filtered, a delivery-pipe from said filtrating medium, an intermediate chamber having communication with the delivery-pipe of the filtrating medium, a discharge-nozzle from the intermediate chamber to the chamber for the filtered water having one of its sides higher than the other and an air-riser communicating with the intermediate chamber.

2. A combined filter and refrigerator consisting of a chamber for the water to be filtered, an ice-chamber, a chamber for the filtered water and a waste-chamber having communication with the ice-chamber together with a filtrating medium within the chamber for the water to be filtered, a delivery-pipe from said filtrating medium, an intermediate chamber having communication with the delivery-pipe of the filtrating medium and the chamber for the filtered water and an air-riser from said intermediate chamber.

In testimony whereof I affix my signature in presence of two witnesses.

HENRY GIESSEL.

Witnesses:
  CHAS. C. BULKLEY,
  L. M. BULKLEY.